(12) United States Patent
Wang

(10) Patent No.: US 9,253,860 B2
(45) Date of Patent: Feb. 2, 2016

(54) COMMISSIONING OF LIGHTING SYSTEMS

(71) Applicant: KONINKLIJKE PHILIPS N.V., Eindhoven (NL)

(72) Inventor: Xiangyu Wang, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/352,003

(22) PCT Filed: Oct. 9, 2012

(86) PCT No.: PCT/IB2012/055442
§ 371 (c)(1),
(2) Date: Apr. 15, 2014

(87) PCT Pub. No.: WO2013/057626
PCT Pub. Date: Apr. 25, 2013

(65) Prior Publication Data
US 2014/0300276 A1    Oct. 9, 2014

Related U.S. Application Data

(60) Provisional application No. 61/548,349, filed on Oct. 18, 2011.

(51) Int. Cl.
*H05B 37/02* (2006.01)
*H04L 12/28* (2006.01)
*G01S 5/02* (2010.01)
*H04W 84/12* (2009.01)
*H04W 4/04* (2009.01)
*G01S 5/16* (2006.01)

(52) U.S. Cl.
CPC .......... *H05B 37/0272* (2013.01); *G01S 5/0284* (2013.01); *H04L 12/2807* (2013.01); *H05B 37/029* (2013.01); *H05B 37/0245* (2013.01); *G01S 5/16* (2013.01); *H04L 2012/2841* (2013.01); *H04W 4/043* (2013.01); *H04W 84/12* (2013.01); *H05B 37/0227* (2013.01)

(58) Field of Classification Search
CPC ........... H05B 37/0272; H05B 37/0227; H05B 37/029
USPC ......... 315/151, 131, 129, 318, 314, 313, 292, 315/153
See application file for complete search history.

(56) References Cited

U.S. PATENT DOCUMENTS

2008/0265799 A1* 10/2008 Sibert .......................... 315/292
2009/0066473 A1    3/2009 Simons
(Continued)

FOREIGN PATENT DOCUMENTS

WO        2010097737 A1    9/2010

*Primary Examiner* — Daniel D Chang
(74) *Attorney, Agent, or Firm* — Meenakshy Chakravorty

(57) ABSTRACT

A lighting system that includes luminaires (1,2,3,4,5) installed at individual locations (R1-5) in premises, is commissioned by placing auxiliary commissioning devices (6) in the premises at spaced apart locations and forming them into a wireless local network. The auxiliary commissioning devices each include a sensor (13) to detect light from the luminaires, establishing the locations of the auxiliary commissioning devices in relation to the premises, for example by using ranging on the basis of signal strengths of the devices (6) in the local network, and detecting light emitted from the luminaires individually with the sensors (13) of the auxiliary commissioning devices such as to associate the luminaires with individual ones of the commissioning devices.

14 Claims, 5 Drawing Sheets

(56) References Cited

U.S. PATENT DOCUMENTS

2010/0231363 A1 9/2010 Knibbe
2010/0301769 A1 12/2010 Chemel et al.
2011/0031897 A1 2/2011 Henig et al.

* cited by examiner

COMMISSIONING OF LIGHTING SYSTEMS

FIELD OF THE INVENTION

This invention relates to commissioning lighting systems, for example in commercial premises such as offices, factories and warehouses.

BACKGROUND OF THE INVENTION

In commercial premises, complex multi-service infrastructures are typically deployed to provide heating, ventilation, air conditioning and lighting control, which may be managed from a central location to simplify maintenance and to optimize energy consumption in the building.

The installation of building infrastructure systems is a complex and lengthy undertaking, particularly in the commissioning process for networked lighting where switches and sensors are associated with one or more luminaires by a manual process so that the luminaires can be operated individually or in groups by specific switches and sensors, with the overall network being managed by a central controller. As a result, the commissioning process is currently a very expensive and labor intensive process.

SUMMARY OF THE INVENTION

In one aspect the invention provides an auxiliary commissioning device for use in commissioning a lighting system that includes luminaires installed at individual locations in premises, the device comprising a portable housing to be placed in a space in the premises, a system within the housing to enable determination of the location of the device in the premises, and a sensor to detect light emitted from the luminaires individually such as to associate individual ones of the luminaires with the commissioning device.

The use of the auxiliary commission devices allows for a substantial reduction in the time taken to commission the network.

The auxiliary commissioning devices may form an ad hoc network with a controller, and the invention includes in another aspect a controller to be connected to a network of luminaires installed at individual locations in premises for commissioning a lighting system including the luminaires, the commissioning being performed utilizing a plurality of auxiliary commissioning devices placed in the premises at spaced apart locations, the devices each including a sensor to detect light from the luminaires, the controller being configured to communicate with the auxiliary commissioning devices to provide data corresponding to their location in the premises cause the luminaires to emit light in an individually detectable manner to be detected by a sensor of a said auxiliary commissioning device, and receive data from the auxiliary commissioning devices associating the device whose sensor detected light from an individual one of the luminaires, such as to associate the luminaires with respective individual ones of the commissioning devices.

The invention also includes a program to be run by the controller to perform the commissioning.

The auxiliary commissioning devices may include radio transceivers to form a wireless network and the establishment of the locations of the auxiliary commissioning devices may be carried out by means of radio signal strength measurements for radio signals transmitted in said wireless network.

At least some of the luminaires may spaced apart by a distance that is less than a minimum distance that can be resolved by said ranging function, and the invention has the advantage that the auxiliary commissioning devices can be placed spaced apart from one another at a distance greater than said minimum distance whilst still resolving the locations of luminaires that are spaced closer than the minimum distance.

BRIEF DESCRIPTION OF THE DRAWINGS

Embodiments of the invention will now be described by way of illustrative example with reference to the accompanying drawings in which.

DETAILED DESCRIPTION OF EMBODIMENTS

Figure 1:
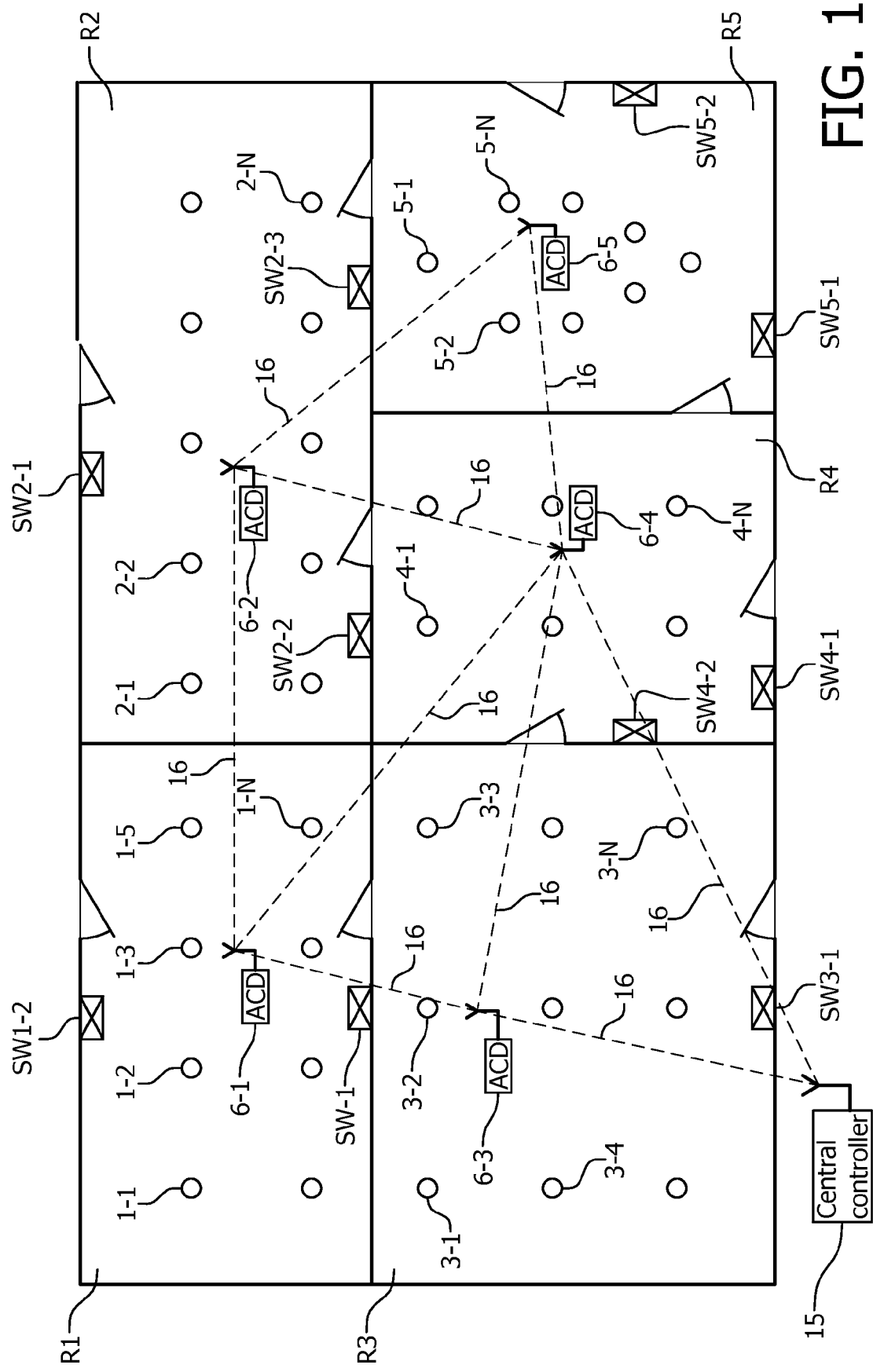
FIG. 1 is a plan view of premises showing rooms that include luminaires to be commissioned utilizing auxiliary commissioning devices.

Referring to FIG. 1, an office premises is shown in plan view that comprises a number of spaces, in this example rooms R1-R5. Whilst the example hereinafter describes office premises, the luminaires could be installed in other commercial premises such as a warehouse, marshalling yard or non-commercial premises such as a domestic dwelling. Ceiling mounted luminaires 1-1; 1-N are arranged in room R1 and similarly rooms R2-R5 include respective luminaires 2-1; 2-N . . . 5-1; 5-N. The luminaires may be installed during construction of the premises or as a retro-fit. Common practice is to arrange the luminaires in a network to be controlled centrally so that effective environmental control can be performed for the entire premises. Suitable network protocols include Digital Address Line Interface (DALI), Zigbee, LLM, Dynet, Starsense, Ethernet and wifi. Additionally, local switches are provided for individual workspaces and in this example R1 includes switches SW1-1 and SW1-2. Switches SW are similarly disposed in rooms R2-R5.

When the lighting system is initially installed, a commissioning process is carried out in order to correlate the locations of the luminaires and associated switches SW from a central location so that the lighting in individual spaces such as rooms R1-R5 can be controlled individually. In order to perform the commissioning, an auxiliary commissioning device (ACD) is placed in each of the work spaces and in the example shown in FIG. 1, ACD 6-1, ACD 6-2 . . . ACD 6-5 are placed in rooms R1-R5 respectively. The ACDs 6 can be connected in an ad-hoc wireless network and each have a local sensor for detecting light from the luminaires in the individual work spaces.

Figure 2:
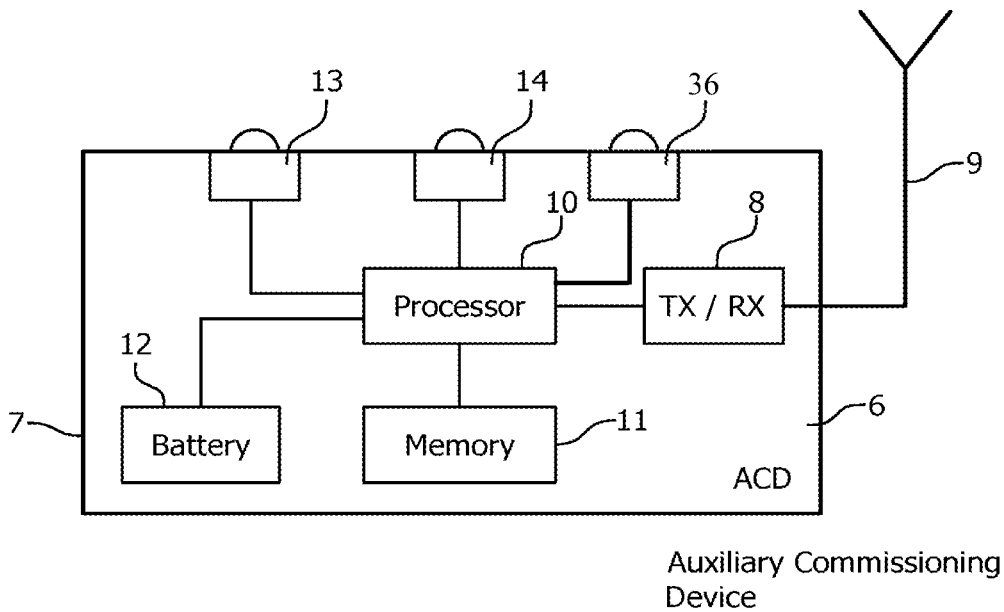
FIG. 2 is an elevational view of one of the rooms.
Figure 3:
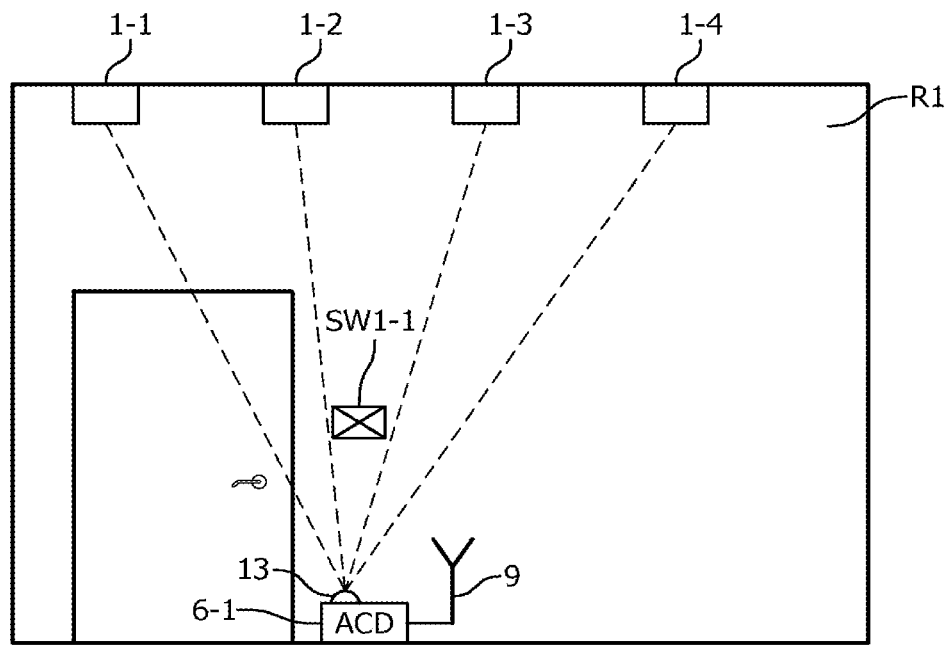
FIG. 3 is a schematic illustration of the main components of an auxiliary commissioning device.

The major components of an ACD 6 are illustrated schematically in FIG. 2. The device 6 includes a portable housing 7 which can be located on the floor or other location within one of the rooms to detect light emitted from the luminaires in a particular work space i.e. the room R or part of it. The device includes a transmitter/receiver unit 8 connected to antenna 9 for wireless communication with other ACDs in an ad-hoc network. The transmitter/receiver unit 8 is also connected to a digital processor 10 with an associated memory 11. The device 6 is driven by a battery 12 that may be rechargeable. A photo sensor 13, which may comprise an array of photo diodes is mounted on the upper side of the housing 7 to receive light emitted from the luminaires in the room as illustrated in FIG. 3 which shows ACD 6-1 located on the floor of room R1 to receive light from luminaires 1-1; 1-2; 1-3 and 1-4. The ACD 6 may also include an ultrasonic or other transducer 14 that permits the processor 10 to perform a location calculation based on ranging performed with the transducer 14.

As shown in FIG. 1, the ACDs 6 form a local ad-hoc wireless network in which they can communicate wirelessly with one another and also with a central controller 15 as illustrated schematically by dotted lines 16. Any suitable ad-hoc networking protocol may be used and in this example, Zigbee is utilized. Thus, the transmitter/receiver unit 8 shown in FIG. 2 comprises a Zigbee transceiver and the central controller 15 shown in FIG. 1 can transmit and receive commands and data to and from the ACDs 6.

Figure 4:
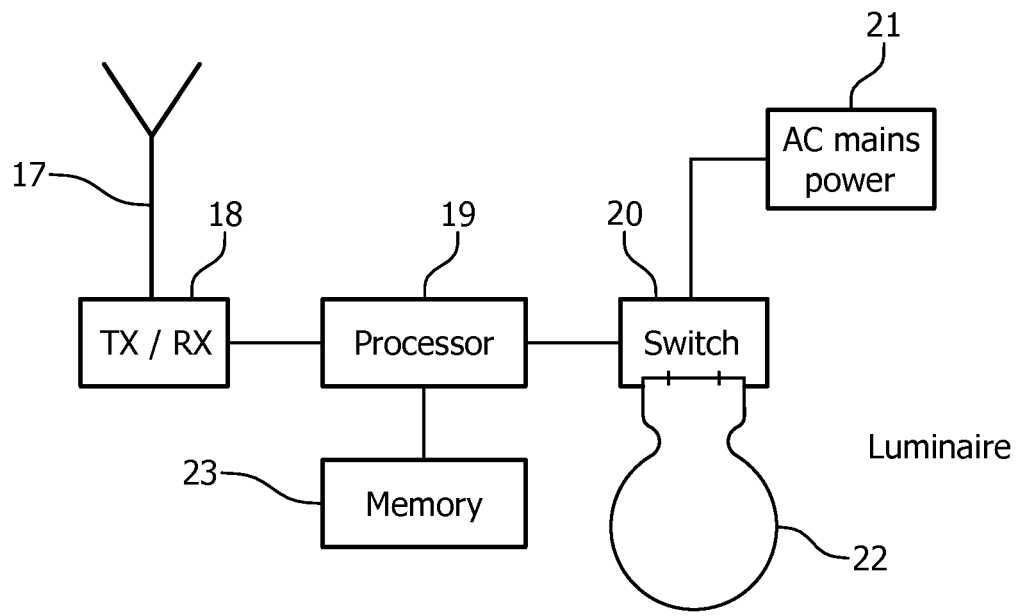
FIG. 4 is a schematic diagram of components of one of the luminaires.

A schematic illustration of the major components of one of the luminaires is illustrated in FIG. 4. As previously mentioned, the luminaires may be connected in a network using any suitable networking protocol and by way of example, the arrangement shown in FIG. 4 is configured to be connected in a wireless protocol and the use of Zigbee will be described by way of example herein. The network could however be hard wired instead of being a wireless network. Thus, referring to FIG. 4, the luminaire includes an antenna 17 coupled to a Zigbee transceiver unit 18 which is coupled to a processor 19 that controls a switch 20 that controls the supply of electrical power 21 to a light emitting unit 22. It will be understood that the lighting unit 22 may be mains powered for example a fluorescent tube, in which case the switch 20 controls the supply of mains power to the unit 22. However, in alternative light systems, the unit 22 may be a LED device in which case a lower voltage power supply 21 will be utilized and the switch 20 is configured accordingly. Also, it will be understood that the switch 20 need not necessarily only switch power on and off and may be used for dimming or other control or modulation of the electrical supply to the light emitting unit 22.

Each of the luminaires has a network address, which is stored as a digital code for example in memory 23 associated with processor 19.

Figure 5:
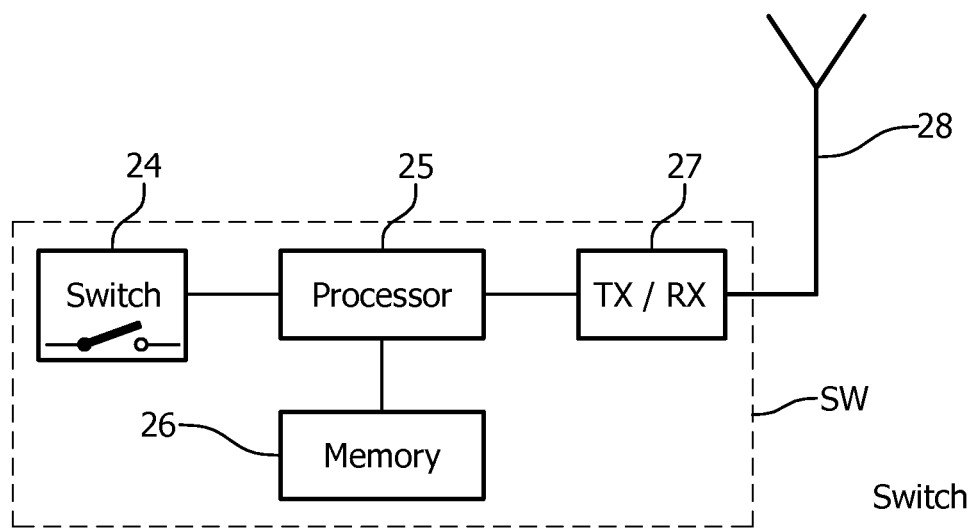
FIG. 5 is an illustration of components of a wireless room switch.

FIG. 5 illustrates the basic components of each of the switches SW shown in FIG. 1. Each of the switches SW includes a manually operable switch 24 coupled to a processor 25 with an associated memory 26 that holds a network address for the individual switch. Processor 25 communicates with a transceiver unit 27, typically operating according to the Zigbee protocol, coupled to antenna 28.

Figure 6:
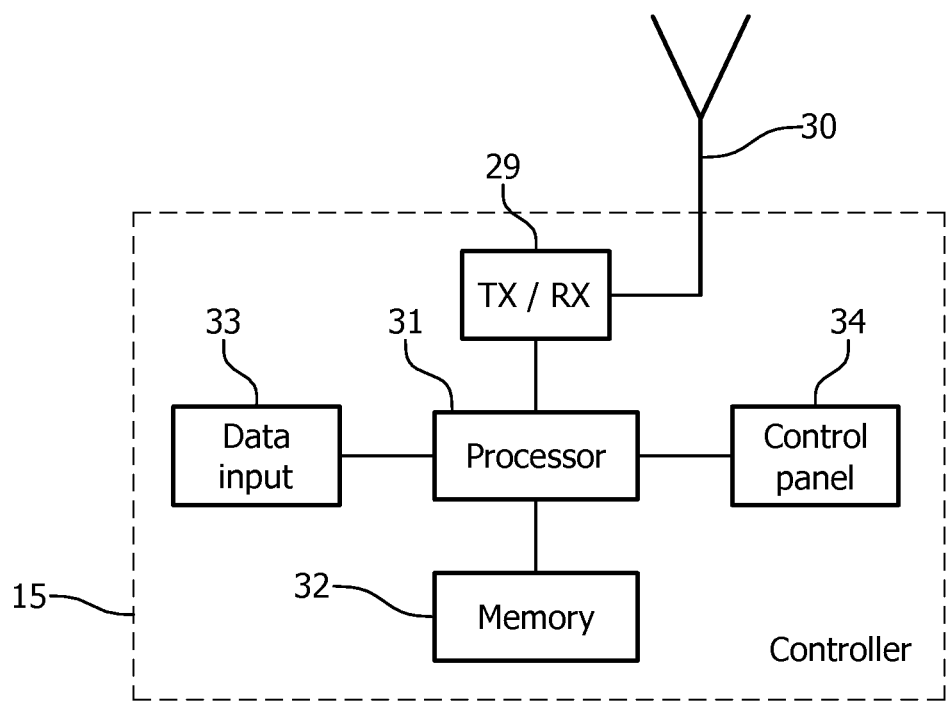
FIG. 6 is a schematic block diagram of the controller.

The central controller 15 is illustrated in more detail in FIG. 6 and comprises a network transceiver 29 which in this example operates according to the Zigbee protocol with an associated antenna 30. Transceiver 29 is coupled to a processor 31 with an associated memory 32 that builds up a map of the ad-hoc network of ACDs and luminaires that they detect, as explained in more detail hereinafter. Data can be input into the memory 32 via the processor 31 through use of a data input device 33, which may include a keyboard or a USB port. Additionally, the controller may include a control panel 34 that allows operational control of the lighting to be performed once the initial commissioning has been carried out.

An example of the commissioning process will now be described with more detail with reference to FIG. 7. In step S1, the ACDs 6-1 . . . 6-5 are placed in the rooms R1-R5 individually in locations where the ACDs are able to detect illumination with the sensor 13 from luminaires in the respective rooms R1-R5. The ACDs are switched on and form an ad-hoc network with the central controller 15 as shown by the lines of communication 16 in FIG. 1.

In step S2, the ACD network addresses or identities are provided to controller 15. This may be carried out manually by entering the data corresponding to the ACD identities into the controller 15 by means of the data input device 33. Alternatively, the central controller may transmit a broadcast enquiry signal into the ad-hoc Zigbee network requesting all of the ACDs to respond with their network addresses in order to provide their IDs to the controller. The received ACD IDs are recorded in memory 32 of the controller 15.

At step S3, the network addresses or IDs of all of the luminaires in rooms R1-R5 are provided to the controller 15 and stored in memory 32. This can be achieved by the controller 15 forming an ad-hoc network with the luminaires and broadcasting an enquiry using the controller transceiver 29 and antenna 30, which is received by the respective antennas 17 of the luminaires shown in FIG. 4. Transceiver 18 feeds the received enquiry signal to the processor 19 which responds by retrieving the network identity from memory 23 and sending a reply signal that includes the network identity. All of the luminaire network identities can in this way be stored in memory 32 of the controller 15.

Figure 7:
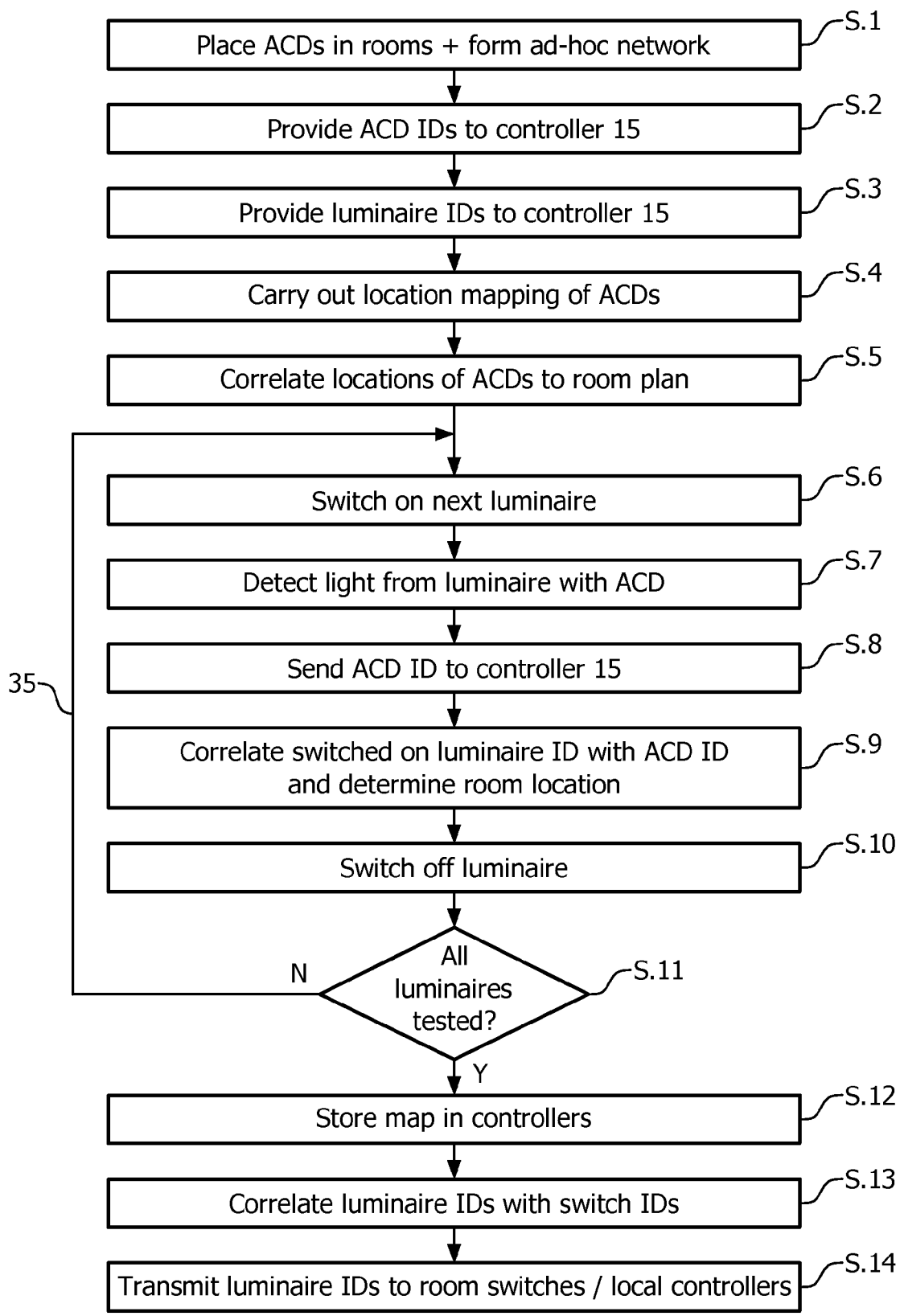
FIG. 7 is a block diagram of the process steps performed to commission the luminaires.

Then, at step S4 shown in FIG. 7, the controller 15 instructs the ACDs and the ad-hoc network to measure the signal strength from adjacent ACDs so that their locations can be mapped. This can be performed by means of algorithm which is well known per se for Zigbee networks.

Then, at step S5, the locations of the ACDs 6 are correlated to the room plan in order to correlate the rooms R1 . . . R5 with the locations of the ACDs 6-1 . . . 6-5. From this calculation, it is determined that ACD 6-1 is in room R1, ACD 6-2 is in room R2, etc. Details of the room plan may be programmed into the memory of the controller 15 using the data input device 33 shown in FIG. 6. The results of the correlation performed at step S5 are stored in memory 32 of the controller 15.

Then, the individual luminaires are correlated with respective ACDs in order to determine the room in which the luminaires are located individually. At step S6, the first of the luminaires is switched on. Considering for example the luminaire 1-1, the light emitted from luminaire is detected by the photo sensor 13 of ACD 6-1 in room R1, as shown in step S7.

Then, at step S8, ACD 6-1 sends its network ID to the controller 15 through the ad-hoc network 16. Thus, the controller 15 can correlate by means of its processor that luminaire 1-1 has been detected by ACD 6-1, which in turn is associated with room R1. This correlation of the switched on luminaire is performed at step S9. Thereafter, the luminaire is switched off at step S10 and the process is repeated for the next luminaire via loop 35 until all of the luminaires have been tested as determined at step S11.

When the testing has been performed for all of the luminaires, a map is built up in the memory 32 of controller 15, indicating the rooms in which the various luminaires are located.

From the foregoing it will be appreciate that the steps S1-S11 may be performed under the control of a computer program held in memory 32 of the controller 15 and run by the processor 31.

The ACDs 6 can then be switched off and taken to another premises to be used for another commissioning operation.

As shown in FIG. 6, the controller 15 includes the control panel 34 which can be configured to run predetermined programs which switch luminaires on and off individually by transmitting commands through transceiver 29 and antenna 30 to the luminaires individually, the commands being received by antenna 17, transceiver 18 and fed to processor 19 so as to control operation of the switch 20, thereby to control periods when the light emitting unit 22 is operative. By using the data map stored in memory 32 during step S12, the control panel can be used to switch the luminaires of individual rooms R on and off selectively and indeed individual luminaires in particular rooms may be switched off and on independently of one another also.

The switches SW in the individual rooms can also be programmed to control luminaires in the individual rooms selectively. Referring again to FIG. 7, the network addresses for the switches SW can be correlated with the luminaire network addresses determined by the previously described commissioning process, as indicated at step S13.

The luminaire network addresses can now be transmitted to the room switches SW selectively so that the switches SW provide local control in the rooms in which they are located. This is performed by the controller 15 forming a list of one or more of the luminaires for a particular room R e.g. luminaires 1-1 ... 1-N for room R1, or a subgroup of the luminaires for a space in part of the room, from the map stored in memory 32, and then transmitting this data through the use of processor 31, transceiver 29 and antenna 30 to the corresponding antennas 28 of the switches located in the room R1, to be received by transceiver 27 and stored by processor 25 in memory 26. In this way, the switch 24 can be manually operated by the user in room R1 to switch the luminaires 1-1 ... 1-N collectively, in groups or individually.

The use of the ACDs 6 has the advantage that a more accurate resolution of the locations of the luminaires can be achieved than for example if the controller 15 were to interrogate the Zigbee transceivers of the luminaires individually and perform range measurements based on the signal strengths of the wireless signals from the luminaire. If the Zigbee location algorithm were to be based on the signal strength of the Zigbee transmissions produced by the transceiver 18 and antenna 17 of the individual luminaires, the resolution is typically between 1.4 and 1.8 meters when an off-the-shelf Zigbee radio transceiver is used. However, in practice, the luminaires are often spaced more closely than this distance in a typical lighting installation and so this approach would not provide an adequate resolution to locate the luminaires individually during the commissioning process. However, in the described commissioning method, the locations of luminaires can be determined even when they are spaced apart by a distance that is less than a minimum distance that can be resolved by the Zigbee ranging function, with the ACDs being spaced apart from one another by a distance greater than the minimum.

Modifications and variations of the described method fall within the scope of the claimed invention. For example, in the method described with reference to FIG. 7, the luminaires are switched on individually one by one in a sequence. However, the luminaires alternatively could be configured to emit light in an individual pulse code sequence corresponding to their network ID, in which case they could be switched on concurrently either all together or in groups in order to reduce the time taken for the commissioning process.

Also in some situations, for example in an open plan office where the ACDs detect luminaires in spaces that form parts of the open plan area, more than one ACD 6 may detect light from an individual luminaire. To resolve this, the ACDs may detect the intensity of the illumination from the luminaire to determine which of two or more ACDs is closest to the illuminaire under test and to associate the luminaire with the ACD 6 which detected the greatest light intensity, indicating that it is closest.

In a modification, optical cameras 36 can be built into the ACDs, as shown in FIG. 2, according to one embodiment. It will be possible for an ACD to determine the locations of luminaires in a room. For that, luminaires can be turned on/off one by one, or the luminaires may transmit coded light. The camera 36 may process the images that it sees and determine the relative locations of luminaires to the commissioning device.

Also, the locations of the ACDs 6 could be determined by means other than the described signal strength determination in the ad-hoc network. For example, the ACDs may include an additional or alternative sensors 14 as shown in FIG. 2, for example an ultrasound detector which can be used to perform a ranging function in relation to the walls of the rooms in which the ACDs are located.

Although the luminaires are described in this example as being controlled through a Zigbee network, it will be understood that other radio networks could be used such as wife. Also, wired network protocols may be utilized such as DALI.

It will be appreciated that the term "comprising" does not exclude other elements or steps and that the indefinite article "a" or "an" does not exclude a plurality. A single processor may fulfill the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived there from.

Other modifications and variations falling within the scope of the claims hereinafter will be evident to those skilled in the art.

The invention claimed is:

1. A controller connected to a network of luminaires installed at individual locations within a premises for commissioning a lighting system including the luminaires, wherein the controller is configured to:
   communicate with each of a plurality of auxiliary commissioning devices to provide data corresponding to their location in the premises, wherein the plurality of auxiliary commissioning devices are placed in the premises at spaced apart locations, and further wherein each of the plurality of auxiliary commissioning devices comprises a sensor to detect light from at least one of the luminaires;
   cause the luminaires to emit light in an individually detectable manner such that the emitted light is detected by a sensor of at least one of said plurality of auxiliary commissioning devices;

receive data from the auxiliary commissioning devices associating which of the plurality of auxiliary commissioning devices detected light emitted from an individual one of the luminaires; and associate, using the received data, the luminaires with respective individual ones of the plurality of auxiliary commissioning devices.

2. The controller of claim 1 wherein the controller is configured for use with auxiliary commissioning devices that are configured to perform a ranging function for establishing range data as a function of their location in relation to the premises, and wherein the controller is further configured to receive the range data from the devices.

3. The controller of claim 1, wherein the auxiliary commissioning devices comprise a radio transceiver, the radio transceivers forming a wireless network, wherein establishing the locations of the auxiliary commissioning devices is accomplished by means of radio signal strength measurements for radio signals transmitted in said wireless network, and wherein the controller is further configured to receive the range data from the auxiliary commissioning devices based on said signal strength measurements.

4. The controller of claim 3, wherein the controller is configured for use with luminaires that are configured in a wireless switching network, and wherein the controller is further configured to associate wireless switches of the wireless switching network with the luminaires.

5. The controller of claim 1, wherein the controller is configured to turn on the luminaires one by one in a sequence.

6. The controller of claim 1, wherein the controller is configured to cause the luminaires to emit light in a predetermined individual modulation pattern.

7. The controller of claim 6, wherein the controller further comprises a wireless transceiver configured to form an ad hoc wireless network with the auxiliary commissioning devices.

8. A lighting commissioning system comprising:
a plurality of luminaires;
at least one auxiliary commissioning device, the auxiliary commissioning device comprising a sensor to detect light from at least one of the luminaires; and
a controller connected to a network comprising said luminaires, wherein the controller is configured to: (i) communicate with the at least one auxiliary commissioning device to provide data corresponding to its location in the premises; (ii) cause the luminaires to emit light in an individually detectable manner such that the emitted light is detected by a sensor of said auxiliary commissioning device; receive data from the auxiliary commissioning device associating which of the at least one auxiliary commissioning devices detected light emitted from an individual one of the luminaires; and associate, using the received data, the luminaires with respective individual ones of the plurality of auxiliary commissioning devices.

9. An auxiliary commissioning device configured for use in commissioning a lighting system comprising a plurality of luminaires installed at individual locations in premises, the auxiliary commissioning device comprising:
a portable housing configured to be placed in a space in the premises;
a system disposed within the housing and configured to enable determination of the location of the device in the premises; and
a sensor to detect light emitted from at least one of the plurality of luminaires individually, wherein individual ones of the luminaires are associated with the commissioning devices.

10. The auxiliary commissioning device of claim 9, further comprising a camera configured to detect the luminaires individually.

11. The auxiliary commissioning device of claim 9, further configured to perform a ranging function to establish its location.

12. The auxiliary commissioning device of claim 9, further comprising a transmitter configured to communicate data with a lighting network controller.

13. A controller comprising a computer program for commissioning a lighting system that includes luminaires installed at individual locations within a premises and connected in a network to the controller, wherein the program is configured to perform the steps of:
instructing each of a plurality of auxiliary commissioning devices to provide data corresponding to their location within the premises, wherein the plurality of auxiliary commissioning devices are placed in the premises at spaced apart locations, and further wherein each of the plurality of auxiliary commissioning devices comprises a sensor to detect light from at least one of the luminaires;
instructing the luminaires to emit light in an individually detectable manner such that the emitted light is detectable by a sensor of at least one of said plurality of auxiliary commissioning device;
receiving data from the auxiliary commissioning devices, the data comprising an association between which of the plurality of auxiliary commissioning devices detected light emitted from an individual one of the luminaires, such as to associate the luminaires with respective individual ones of the plurality of auxiliary commissioning devices.

14. A method for commissioning a lighting system comprising luminaires installed at individual locations within a premises, the method comprising the steps of:
placing within the premises at spaced apart locations a plurality of auxiliary commissioning devices, each of the plurality of auxiliary commissioning devices comprising a sensor configured to detect light from at least one of the luminaires;
establishing, within the premises, the location of each of the plurality of auxiliary commissioning devices; and
detecting light emitted from the luminaires individually with the sensors of the auxiliary commissioning devices in order to associate the luminaires with individual ones of the plurality of auxiliary commissioning devices, wherein the lighting system is configured to cause the luminaires to emit light in an individually detectable manner.

* * * * *